Nov. 3, 1942.  H. G. KAMRATH  2,301,121

OIL FILTER

Filed July 13, 1940

Inventor
Herbert G. Kamrath
By Blackmore, Spencer & Flint
Attorneys

Patented Nov. 3, 1942

2,301,121

UNITED STATES PATENT OFFICE 2,301,121

OIL FILTER

Herbert G. Kamrath, Flint, Mich., assignor to General Motors Corporation, Detroit, Mich., a corporation of Delaware Application July 13, 1940, Serial No. 345,313

1 Claim. (Cl. 210—131)

This invention relates to oil filters and has particular reference to a bag for enclosing the filtering material.

The essence of the invention consists in providing a central column, preferably of metal, having perforations formed by pressing the metal from the inside so that the metal on the outside will leave sharp edges. The bag is pulled over the column and is over twice as long as the column so that the end of the bag will extend a distance below the column at least the full length thereof. A filtering material is then applied around the bag where it surrounds the column and the bag is then inverted or turned on itself and pulled up over the outside of the filtering material. The outer end, or the end which is pulled over the filtering material, is then positioned over the inner end and tucked in between the inner end and the column so that the sharp metal edges of the perforations will retain the end of the bag.

On the drawing

Figure 1:
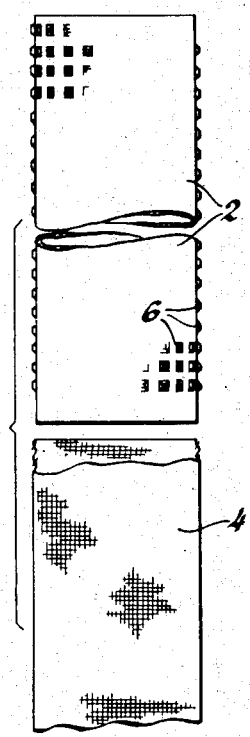
Figure 1 is a view of the central perforate column with the bag therebelow and before it is pulled over the column.

Referring to the drawing, the numeral 2 indicates a tubular column, and 4 the bag of the invention. The column 2 is provided with perforations entirely around its circumference, these perforations being formed by pressing the metal from the inside outwardly whereby sharp points are formed on the metal around the perforations. The perforations are indicated at 6 and in forming these perforations the outside part thereof forms sharp edges or teeth to retain the bag.

Figure 2:
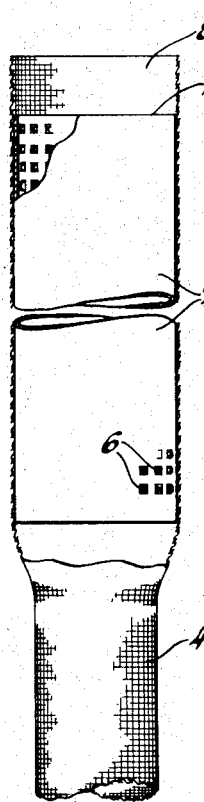
Figure 2 is a view of the same parts, but with the bag pulled over the column.

The bag 4 is then pulled up over the column 2 as shown in Figure 2, and the upper and inner end 8 is caused to extend a short distance above the upper end 10 of the column.

Figure 3:
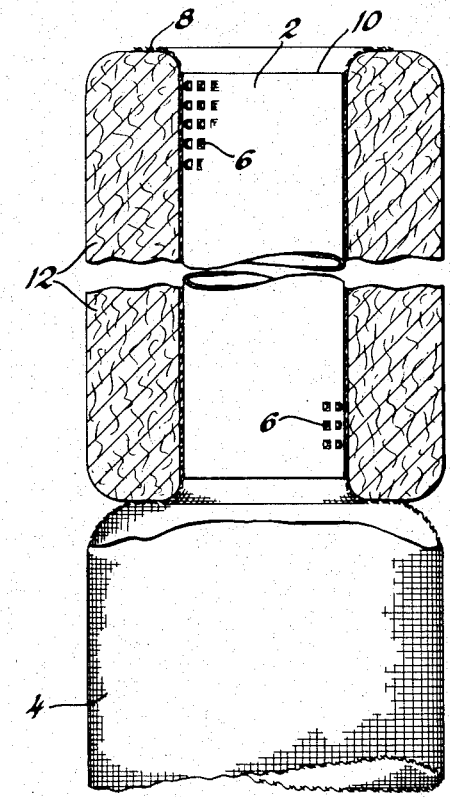
Figure 3 is a view of the parts of Figures 1 and 2, but showing the filtering material applied and with the lower part of the view showing the extent to which the bag may stretch or expand.

A filtering material 12 of any suitable type is then packed around the bag 4 where it surrounds the column 2 shown in Figure 3. This filtering material may be mineral wool, wood pulp, paper pulp, cotton linters or cotton batting, or the like.

Figure 4:
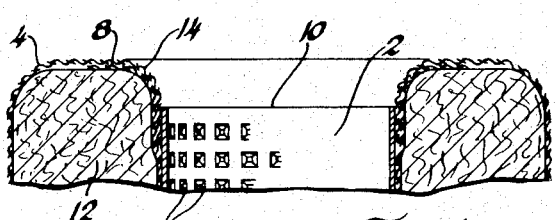
Figure 4 is a partial sectional view of the top of the filtering unit showing how the bag ends are secured in place.

The bag 4 is of fabric and is capable of considerable stretch and with the filtering material 12 packed as shown in Figure 3 the lower or free end of the bag 4 is then inverted or folded back on itself and drawn upwardly around the outside of the filtering material 12. The extension 8 of the top of the bag is placed over the top of the filtering material 12 and the free end 14 of the bag is positioned over the free or inner end 8 and the end 14 tucked down in between the upper end 10 of the cylindrical part 2 and the inner end of the bag adjacent the cylinder. The sharp edges on the perforations 6 will tightly hold the end 14 of the bag. This structure is best shown in Figure 4.

Figure 5:
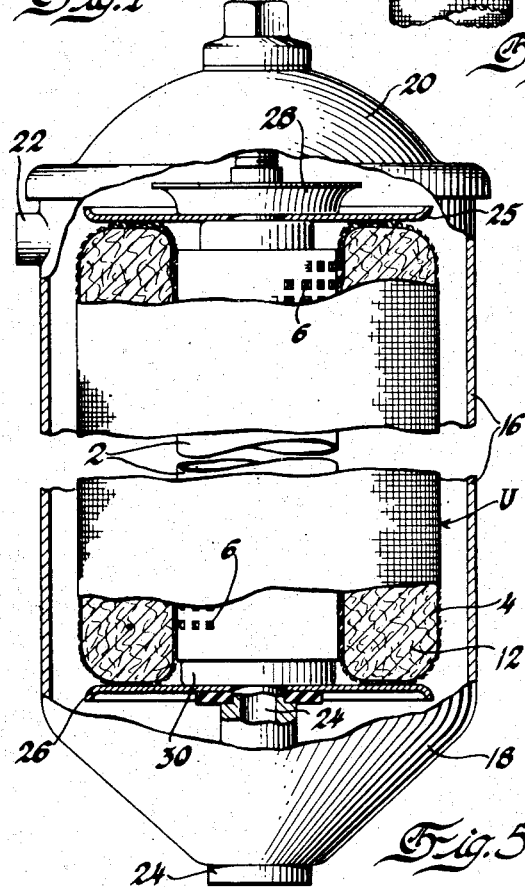
Figure 5 is a view of the filter container with parts broken away and showing the bag in section applied and mounted inside the container.

The filtering unit indicated as a whole at U in Figure 5 is now positioned in a filtering container 16 having a truncated conical bottom 18 and a removable cover 20. The oil enters at the inlet 22 and leaves from the outlet 24 and the oil passes through the filter in the manner described in the copending application of John F. Houston for an Oil filter, Serial No. 345,324, filed July 13, 1940. The numeral 25 designates a removable end of the filtering frame, and the numeral 26 the stationary end. A handle 28 is provided to remove the unit from the container 16.

The stationary plate 26 has an upwardly projecting cylindrical member 30 secured thereto and this element projects into the interior of the cylinder or column 2 to hold it in place.

I claim:

In a filter, a perforated metal central column, said perforations being formed by pressing the metal of the column from the inside outwardly to form sharp edges on the pressed out metal around the openings, an elongated fabric filter bag over the entire length of the column, said bag being considerably longer than the column and having the inner end thereof positioned around one end of the column and the other or outer end extending freely beyond the other end of the column, a filtering material surrounding the bag where it fits over the column, the free end of said bag being reversed on itself and drawn backward over the outside of the filtering material to cause the bag to cover the exterior and ends of the filtering material, the free or outer end of said bag being held in place by tucking it over the inner end between the column and inner end to enable the sharp edges to grip the fabric tightly to hold the fabric in place.

HERBERT G. KAMRATH.